(No Model.)

R. L. CUMNOCK.
AUTOMATIC FIRE EXTINGUISHER.

No. 522,656. Patented July 10, 1894.

WITNESSES.
Frank G. Parker.
Eva A. Gould.

INVENTOR.
Robert L. Cumnock
by Geo. O. G. Bran
his attorney

UNITED STATES PATENT OFFICE.

ROBERT L. CUMNOCK, OF HENDERSON, KENTUCKY.

AUTOMATIC FIRE-EXTINGUISHER.

SPECIFICATION forming part of Letters Patent No. 522,656, dated July 10, 1894.

Application filed June 16, 1893. Serial No. 477,783. (No model.)

*To all whom it may concern:*

Be it known that I, ROBERT L. CUMNOCK, of Henderson, Henderson county, Kentucky, have invented a new and useful Improvement in Automatic Fire-Extinguishers, of which the following is a specification.

My invention relates mainly to the valve and the means by which it is held on and thrown from its seat, and it consists in certain details of construction more fully described below.

Figure 1:
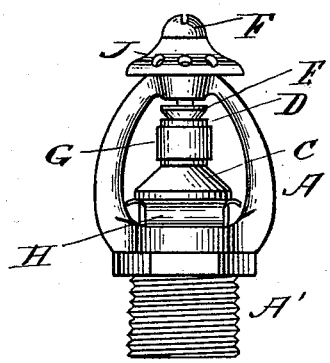
Figure 2:
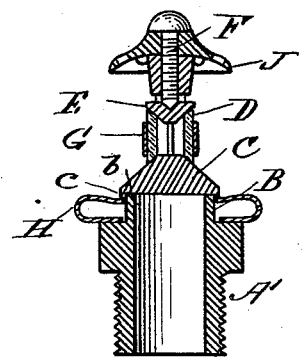
Figure 3:
Figure 3:
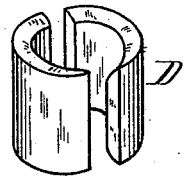
Figure 3:
Figure 3:
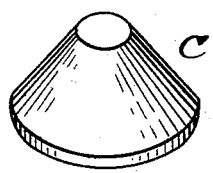

In the drawings Figure 1 is an elevation of an automatic sprinkler embodying my invention, Fig. 2 being a vertical section and Fig. 3 a detail view showing the various parts separated.

A is the frame of the sprinkler head which is preferably cast in one piece and is provided with a tubular threaded part A' for connection with the pipe system. B is an extension of this part A' to form the valve seat b.

C is the valve. It consists of a conical piece, the face or bottom of which is of slightly greater diameter than the diameter of the seat and is turned out so as to form a tight joint with the valve seat and leave a lip c which shall overhang the valve seat.

D is the valve stem or support which consists of a hollow cylinder divided into sections by cuts parallel to its axis. Each end of this sectional support is countersunk slightly and one end rests around the apex of the valve, while the other end receives a conical piece E, which is slightly indented on its upper side to form a bearing for the screw F. The sections of the valve stem are held together and in place by the ring G, which consists of two or more pieces of metal united by a solder fusible at low temperature and forms the fusible joint.

H is a leaf spring preferably made of the shape shown, soldered or otherwise attached to the frame A and surrounding the valve seat. The upper surface of this spring is slightly above the level of the top of the valve seat, when the valve is not in place. When the valve is in place however, the face of the lip c of the valve rests on this spring and compresses it so that when the fusible joint melts and releases the valve support, the force of this spring will assist the force of the water in throwing the valve off its seat.

In putting my extinguisher together, the valve is laid on over its seat, its lip c resting upon the spring H. The ring forming the fusible joint G is placed about the valve stem D to hold its parts together, and the bearing E, being set into the top of the stem, the stem is then placed on top of the valve and immediately under the screw F, which is turned down until the valve is tight upon its seat, thus compressing the spring H. If the bottom of the screw F is sufficiently large the use of the bearing E is unnecessary.

In operation, when a sufficient degree of heat has been reached to melt the solder in the fusible joint, the parts of the ring forming the joint, separate and immediately the valve is thrown upward by means of the spring H, acting with the water pressure. The conical top of the valve tends to separate the lower ends of the sections of the valve support, and if the bearing F is also conical as shown, this same tendency causes the upper ends of the valve support to be separated, and the parts of the valve support are almost instantly scattered and a clear passage is left for the water to strike the deflector J.

It is well known that in all automatic fire extinguishers of the kind referred to, there is, under certain circumstances, a great liability to corrosion. For this reason I prefer to make the valve support or stem D of glass or other non-corrodible material, this being a convenient way of so constructing a device that the valve and its support shall not become firmly attached by corrosion but shall break apart the instant they are released by the breaking of the solder joint.

The sprinkler is easily manufactured and the fusible joint may be easily renewed in case, for any reason, the solder gives out. The conical shape of the valve, I believe to be of value, as it furnishes a step for the valve stem which tends to scatter the support the instant the fusible joint is broken and so release the valve.

What I claim as my invention is—

1. In an automatic fire extinguisher in combination, a frame, a valve seat, a valve, one surface of which is adapted to rest upon said valve seat, the opposite surface being conical, a valve support resting on said valve, a conical bearing resting upon the upper side of said valve support and located between it and said frame, said valve support being made in vertical sections adapted to be separated by the wedge like action of the valve and bearing and held in place by the surrounding fusible joint, all as set forth.

2. In an automatic fire extinguisher a frame, a valve and valve seat, in combination with the leaf spring fastened at each end to the frame, said leaf spring being wider than the valve seat and having therein a hole of diameter slightly greater than the valve seat, thus forming a yielding surface approximately parallel to the plane of the valve seat and located about the valve seat in the manner described, whereby the seating of the valve will cause a substantially equal compression of the spring on all sides, and said spring will assist in the unseating of the valve on all sides, all as set forth.

3. In an automatic fire extinguisher, in combination, a frame, a valve seat, a leaf spring attached to said frame and surrounding said valve seat lying when free, in a plane above said valve seat and substantially parallel thereto, a cup shaped valve, the rim of said cup being adapted to depress said spring, the upper surface of said valve being conical in shape and a valve support concaved at each end and divided into sections on lines parallel with the axis of the valve and surrounded by a fusible joint, and the conical bearing E, all as and for the purposes set forth.

In testimony whereof I have hereunto subscribed my name this 29th day of May, 1893.

R. L. CUMNOCK.

Witnesses:
   WM. H. WITT,
   B. G. WITT.